US012770331B2

(12) United States Patent
Kim et al.

(10) Patent No.: US 12,770,331 B2
(45) Date of Patent: Oct. 20, 2026

(54) DEVICE AND METHOD FOR RECONSTRUCTING MOVING OBJECTS IN VIDEOS USING A HIERARCHICAL NEURAL DEFORMATION MODEL

(71) Applicant: UIF (UNIVERSITY INDUSTRY FOUNDATION), YONSEI UNIVERSITY, Seoul (KR)

(72) Inventors: Seon Joo Kim, Seoul (KR); Subin Jeon, Seoul (KR); In Cho, Seoul (KR); Minsu Kim, Seoul (KR); Woong Oh Cho, Seoul (KR)

(73) Assignee: UIF (UNIVERSITY INDUSTRY FOUNDATION), YONSEI UNIVERSITY, Seoul (KR)

( * ) Notice: Subject to any disclaimer, the term of this patent is extended or adjusted under 35 U.S.C. 154(b) by 61 days.

(21) Appl. No.: 18/934,166

(22) Filed: Oct. 31, 2024

(65) Prior Publication Data

US 2026/0120404 A1 Apr. 30, 2026

(30) Foreign Application Priority Data

Oct. 30, 2024 (KR) ........................ 10-2024-0150360

(51) Int. Cl.
*G06T 17/20* (2006.01)
*G06T 13/40* (2011.01)

(52) U.S. Cl.
CPC .............. *G06T 17/20* (2013.01); *G06T 13/40* (2013.01)

(58) Field of Classification Search
CPC ................................ G06T 17/20; G06T 13/40
See application file for complete search history.

(56) References Cited

FOREIGN PATENT DOCUMENTS

KR 10-2023-0131970 A 9/2023

OTHER PUBLICATIONS

Yang et al. BANMo: Building Animatable 3D Neural Models from Many Casual Videos, Proceedings of the IEEE/CVF Conference on Computer Vision and Pattern Recognition (CVPR), 2022, pp. 2863-2873 (Year: 2022).*

* cited by examiner

*Primary Examiner* — Yingchun He
(74) *Attorney, Agent, or Firm* — Studebaker Brackett PLLC

(57) ABSTRACT

The present invention relates to a device for reconstructing moving objects in videos using a hierarchical neural deformation model, and a video input unit that receives a video, an embedding generation unit that generates a canonical embedding and a time embedding for an object in the video, a hierarchical neural deformation model unit that receives the canonical embedding and the time embedding, captures coarse-to-fine hierarchical neural deformations of the object, and outputs a time-independent bone structure and a time-dependent bone deformation of the object through a neural network, and a temporally deformed object representation unit that represents the temporal deformation of the object as a temporally deformed object in a canonical space based on the time-independent bone structure and the time-dependent bone deformation of the object.

12 Claims, 9 Drawing Sheets

DEVICE AND METHOD FOR RECONSTRUCTING MOVING OBJECTS IN VIDEOS USING A HIERARCHICAL NEURAL DEFORMATION MODEL

CROSS-REFERENCE TO RELATED APPLICATION

This application claims under 35 U.S.C. § 119 (a) the benefit of Korean Patent Application No. 10-2024-0150360 filed on Oct. 30, 2024, the entire contents of which is incorporated herein by reference.

TECHNICAL FIELD

The present invention relates to a technology for reconstructing moving objects in videos using a hierarchical neural deformation model, and more specifically, to a device and method for reconstructing moving objects in videos using a hierarchical neural deformation model capable of capturing coarse-to-fine hierarchical neural deformations of the object and representing a temporal deformation of the object as a temporally deformed object in a canonical space based on a time-independent bone structure and a time-dependent bone deformation of the object through a neural network.

BACKGROUND

Artificial intelligence (AI)-based video processing technology encompasses various technologies for analyzing, modifying, and converting a video using artificial intelligence and a deep learning algorithm. These technologies are used to improve the quality of the video, supplement missing data between frames, and generate a new video. AI-based video processing is similar to image processing, but requires more complex algorithms because the AI-based video processing should consider temporal consistency and correlation between frames.

In Korean Patent Publication No. 10-2023-0131970 (Sep. 14, 2023), in one embodiment, a method includes a step of receiving a first image and a second image using an object reconstruction module. The first image includes a first region of an object, and the second image includes a second region of the object. The method also includes a step of identifying a transition image using the object reconstruction module. The transition image includes a first region of the object and a second region of the object. The method also includes a step of determining that the first region of the object in the transition image and the first region of the object in the first image are equivalent regions using the object reconstruction module, and a step of generating a reconstruction of the object using the first image and the transition image using the object reconstruction module. The reconstruction of the object includes the first region of the object and the second region of the object and excludes the equivalent region.

PRIOR ART LITERATURE

Patent Literature

Korean Patent Publication No. 10-2023-0131970 (Sep. 14, 2023)

INTENTION DESCRIPTION

Objects to be Achieved

An embodiment of the present invention provides a device and method for reconstructing moving objects in videos using a hierarchical neural deformation model capable of generating a canonical embedding and a time embedding for an object in a video.

An embodiment of the present invention provides a device and method for reconstructing moving objects in videos using a hierarchical neural deformation model capable of receiving the canonical embedding and the time embedding, capturing coarse-to-fine hierarchical neural deformations of the object, and outputting a time-independent bone structure and a time-dependent bone deformation of the object through a neural network An embodiment of the present invention provides a device and method for reconstructing moving objects in videos using a hierarchical neural deformation model capable of representing the temporal deformation of the object as a temporally deformed object in a canonical space based on the time-independent bone structure and the time-dependent bone deformation of the object.

SUMMARY

In embodiments, a device for reconstructing moving objects in videos using a hierarchical neural deformation model includes a video input unit configured to receive a video; an embedding generation unit configured to generate a canonical embedding and a time embedding for an object in the video; a hierarchical neural deformation model unit configured to receive the canonical embedding and the time embedding, capture coarse-to-fine hierarchical neural deformations of the object, and output a time-independent bone structure and a time-dependent bone deformation of the object through a neural network; and a temporally deformed object representation unit configured to represent the temporal deformation of the object as a temporally deformed object in a canonical space based on the time-independent bone structure and the time-dependent bone deformation of the object.

The embedding generation unit may generate the canonical embedding as a vector representing a basic form and appearance of the object being independent of time and providing a deformation criterion in the canonical space.

The embedding generation unit may generate the time embedding as a vector representing object change for each frame of the video.

The hierarchical neural deformation model unit may combine the canonical embedding with the time embedding to generate a tree-structured bone for the object, and model the motion of the object.

The hierarchical neural deformation model unit may generate a tree-structured bone as a parent-child bone structure, capture a relatively large motion of the object through the parent bone, and capture a relatively small motion of the object through the child bone.

The hierarchical neural deformation model unit may process a coarse-level neural deformation of the object through the parent bone and processes a fine-level neural deformation of the object through the child bone, to learn an interaction between the parent-child bones through the neural network.

The hierarchical neural deformation model unit may determine the time-dependent bone deformation through a skinning weight.

The hierarchical neural deformation model unit may compute a skinning weight for how much each part of the object is influenced by a specific bone using a linear blend skinning (LBS) technique.

The temporally deformed object representation unit may reconstruct the hierarchical neural deformation model the object into the next time-independent bone structure through the canonical space.

The device for reconstructing moving objects in videos using a hierarchical neural deformation model may further include a bone mask generation unit configured to generate a bone mask for detecting which region of the object a specific bone influences for the time-dependent bone deformation through a bone occupancy function (BOF).

The device for reconstructing moving objects in videos using a hierarchical neural deformation model may further include a volume rendering unit configured to perform visualization through dimensional transformation of the temporally deformed object.

In embodiments, a method for reconstructing moving objects in videos using a hierarchical neural deformation model performed in a device for reconstructing moving objects in videos using a hierarchical neural deformation model includes a video input step of receiving a video; an embedding generation step of generating a canonical embedding and a time embedding for an object in the video; a hierarchical neural deformation model step of receiving the canonical embedding and the time embedding and capturing coarse-to-fine hierarchical neural deformations of the object, and outputting a time-independent bone structure and a time-dependent bone deformation of the object through a neural network; and a temporally deformed object representation step of representing the temporal deformation of the object as a temporally deformed object in a canonical space based on the time-independent bone structure and the time-dependent bone deformation of the object.

Effects of the Invention

The disclosed technology can have the following effects. However, since this does not mean that a specific embodiment should include all of the following effects or only the following effects, the scope of the disclosed technology should not be understood as being limited thereby.

According to the device and method for reconstructing moving objects in videos using a hierarchical neural deformation model according to an embodiment of the present invention, it is possible to generate a canonical embedding and a time embedding for an object in a video.

According to the device and method for reconstructing moving objects in videos using a hierarchical neural deformation model according to an embodiment of the present invention, it is possible to receive the canonical embedding and the time embedding, capture coarse-to-fine hierarchical neural deformations of the object, and output a time-independent bone structure and a time-dependent bone deformation of the object through a neural network According to the device and method for reconstructing moving objects in videos using a hierarchical neural deformation model according to an embodiment of the present invention, it is possible to represent the temporal deformation of the object as a temporally deformed object in a canonical space based on the time-independent bone structure and the time-dependent bone deformation of the object.

DETAILED DESCRIPTION

Figure 1:
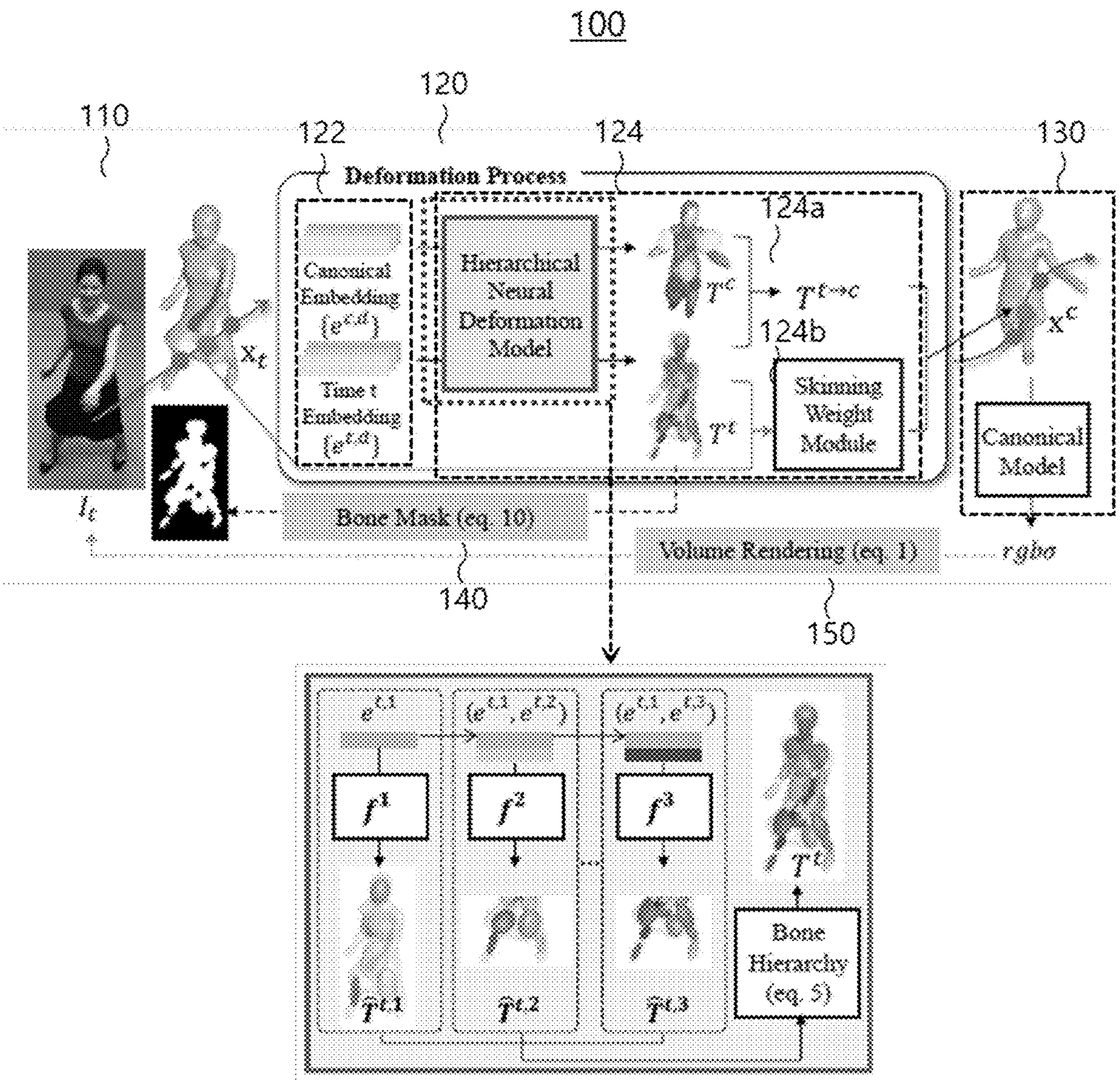
FIG. 1 is a diagram illustrating a device for reconstructing moving objects in videos using a hierarchical neural deformation model according to an embodiment of the present invention.

A description of the present disclosure is merely an embodiment for a structural or functional description and the scope of the present disclosure should not be construed as being limited by an embodiment described in a text. That is, since the embodiment can be variously changed and have various forms, the scope of the present disclosure should be understood to include equivalents capable of realizing the technical spirit. Further, it should be understood that since a specific embodiment should include all objects or effects or include only the effect, the scope of the present disclosure is limited by the object or effect.

Meanwhile, meanings of terms described in the present application should be understood as follows.

The terms "first," "second," and the like are used to differentiate a certain component from other components, but the scope of should not be construed to be limited by the terms. For example, a first component may be referred to as a second component, and similarly, the second component may be referred to as the first component.

It should be understood that, when it is described that a component is "connected to" another component, the component may be directly connected to another component or a third component may be present therebetween. In contrast, it should be understood that, when it is described that an element is "directly connected to" another element, it is understood that no element is present between the element and another element. Meanwhile, other expressions describing the relationship of the components, that is, expressions such as "between" and "directly between" or "adjacent to" and "directly adjacent to" should be similarly interpreted. It is to be understood that the singular expression encompasses a plurality of expressions unless the context clearly dictates otherwise and it should be understood that term "include" or "have" indicates that a feature, a number, a step, an operation, a component, a part or the combination thereof described in the specification is present, but does not exclude a possibility of presence or addition of one or more other features, numbers, steps, operations, components, parts or combinations thereof, in advance.

In each step, reference numerals (e.g., a, b, c, etc.) are used for convenience of description, the reference numerals are not used to describe the order of the steps and unless otherwise stated, it may occur differently from the order specified. That is, the respective steps may be performed similarly to the specified order, performed substantially simultaneously, and performed in an opposite order.

The present disclosure can be implemented as a computer-readable code on a computer-readable recording medium and the computer-readable recording medium includes all types of recording devices for storing data that can be read by a computer system. Examples of the computer readable recording medium may include a ROM, a RAM, a CD-ROM, a magnetic tape, a floppy disk, an optical data storage device, and the like. Further, the computer readable recording media may be stored and executed as codes which may be distributed in the computer system connected through a network and read by a computer in a distribution method.

If it is not contrarily defined, all terms used herein have the same meanings as those generally understood by those skilled in the art. Terms which are defined in a generally used dictionary should be interpreted to have the same meanings as the meanings in the context of the related art, and are not interpreted as ideal meanings or excessively formal meanings unless clearly defined in the present application.

A hierarchical neural deformation model is a deep learning-based technique for efficiently capturing and modeling a motion of an object, and can represent the deformation of the object hierarchically in a coarse-to-fine manner by utilizing a tree structure. This may be mainly used to represent the motion of a complex object more precisely in a video or a 3D model animation. The hierarchical neural deformation model utilizes a tree structure consisting of parent bones and child bones to represent the deformation of objects, in which the parent bone is responsible for a large motion of the object, and the child bone may handle a motion in more fine parts.

The hierarchical neural deformation model is a reference space in which a basic structure of the object is represented, the hierarchical neural deformation model describes how an object is deformed over time in a canonical state which is a basic form of the object that does not change over time, and learn and process how an object is deformed over time through time-dependent deformation for processing different deformations for each time frame.

The hierarchical neural deformation model may utilize Linear Blend Skinning (LBS) for computing how much 3D coordinates of an object are influenced by bones by calculating an influence of each bone on motions of each object to help the object be deformed smoothly, and representing how a parent bone and a child bone interact with each other and contribute to the deformation of the object.

FIG. 1 is a diagram illustrating a device for reconstructing moving objects in videos using a hierarchical neural deformation model according to an embodiment of the present invention.

Referring to FIG. 1, a device for reconstructing moving objects in videos using a hierarchical neural deformation model 100 may include a video input unit 110, a deformation processing unit 120, a temporally deformed object representation unit 130, a bone mask generation unit 140, and a volume rendering unit 150, and the deformation processing unit 120 may include an embedding generation unit 122 and a hierarchical neural deformation model unit 124.

The video input unit 110 may receive a video. More specifically, an operation of the video input unit 110 is as follows.

The video input unit 110 may receive video files of various formats (MP4, AVI, MOV, and the like). These may be videos captured by a camera or pre-prepared video files. The video input unit 110 may also process a video streamed in real time through a network, and in this case, may include a function of capturing real-time data.

Since video files are generally stored in a compressed state, the video input unit 110 may first extract original frames through a decoding process of converting frames of a video into an uncompressed image format that can be individually processed.

The video input unit 110 may extract individual frames from the decoded video and preprocess the frames into a format required by a system. For example, the video input unit 110 may perform tasks such as resolution adjustment, color correction, and noise removal.

The video input unit 110 may analyze metadata (resolution, frame rate, color space, and the like) included in the video file to ensure that the video is correctly processed. The video input unit 110 may also process the number of frames, frames per second (FPS), time information, and the like of the video so that the video can be appropriately analyzed and reconstructed in a subsequent step.

The video input unit 110 may transfer collected and processed video data to the next step (for example, analysis, reconstructing, deformation, and the like) so that the video data can be used to create a 3D model or analyze videos through processing using various algorithms within the system.

The embedding generation unit 122 may generate canonical embedding and time embedding for objects in the video.

More specifically, an operation of the embedding generation unit 122 is as follows.

The embedding generation unit 122 may detect a specific object in the input video, distinguish a boundary of the object through a process of separating the object from a background and analyzing the object, and ascertain where the object is located and in what form the object appears in the video.

The embedding generation unit 122 may learn a basic form and structure of the object and generate an embedding representing the basic form and structure in a canonical state. In this case, the embedding generation unit 122 may represent visual information such as the size or shape of the object as an embedding vector. The embedding generation unit 122 may extract the canonical embedding that reflects a unique structure of the object that does not change over time.

The embedding generation unit 122 may learn deformation information of the object over time and model how the object is deformed and moved for each time frame. The time embedding may capture a detailed difference that occurs when the object is moved or deformed and reflect the deformation over time in each frame of the video.

The embedding generation unit 122 may combine the canonical embedding with the time embedding to generate a complete embedding vector that reflects both spatial and temporal characteristics of the object. This embedding may be used to process the motion of the object more precisely in subsequent analysis and reconstruction process.

The hierarchical neural deformation model unit 124 may receive the canonical embedding and the time embedding, capture the coarse-to-fine hierarchical neural deformations of the object, and output a time-independent bone structure 124*a* and a time-dependent bone deformation 124*b* of the object through the neural network.

More specifically, an operation of the hierarchical neural deformation model unit 124 is as follows.

The hierarchical neural deformation model unit 124 may indicate a basic 3D form and structure of the object, and may receive a canonical embedding that represents a unique state that does not change over time, and a time embedding that represents how the object is deformed and moved over time and reflects a dynamic change that occurs in each time frame.

The hierarchical neural deformation model unit 124 may use a tree-shaped bone model with a parent-child structure to capture the coarse-to-fine-grained motions of the object, thereby hierarchically processing deformation from a large motion to a small motion, so that the motion of the object can be represented more accurately. For example, in the hierarchical neural deformation model unit 124, the parent bone handles the large motion (entire operation of the arm), and the child bone handles fine motion (a motion of fingers).

The hierarchical neural deformation model unit 124 represents a basic form of the object and may output the time-independent bone structure 124*a* that remains constant regardless of time, that is, does not change even if the object moves over various time zones. For example, the hierarchical neural deformation model unit 124 may maintain a basic body structure (arms, legs, head, or the like) even when a person takes various poses or moves based on the canonical embedding.

The hierarchical neural deformation model unit 124 may capture how the object is deformed and moved in each time frame based on the time embedding and output the deformation of the bone according to the corresponding time. For example, the hierarchical neural deformation model unit 124 may represent fine motion of the arm or leg differently over time by capturing the time-dependent deformation through the bones in a walking or running operation of a person.

The hierarchical neural deformation model unit 124 may continuously learn and optimize the bone structure and deformation of the object through the neural network. Through this, the hierarchical neural deformation model unit 124 may process the motion of the object more naturally and represent the deformation of the object in the video in a fine manner. Further, the hierarchical neural deformation model unit 124 may ensure that the bone deformation is smoothly applied to a surface deformation of the object by using a Linear Blend Skinning (LBS) technique. In other words, the hierarchical neural deformation model unit 124 may enable the motion of each bone to be connected to a surface of the object to generate a natural deformation.

The temporally deformed object representation unit 130 may represent the temporal deformation of the object as a temporally deformed object in the canonical space based on the time-independent bone structure 124*a* and the time-dependent bone deformation 124*b* of the object.

More specifically, an operation of the temporally deformed object representation unit 130 is as follows.

The temporally deformed object representation unit 130 may receive data of the time-independent bone structure 124*a* and the time-dependent bone deformation 124*b*, which are data reflecting both a basic state of the object and the deformation over time.

The temporally deformed object representation unit 130 may represent the state of the object in each time frame by utilizing the time-dependent bone deformation 124*b* through a process of calculating the deformation over time based on the basic structure of the object in the canonical space.

The temporally deformed object representation unit 130 may generate a temporally deformed object reflecting the deformation of the object over a time axis by combining the time-independent bones with the time-dependent deformation. The temporally deformed object may consistently represent a deformed state over time based on a canonical criterion.

Figure 2:
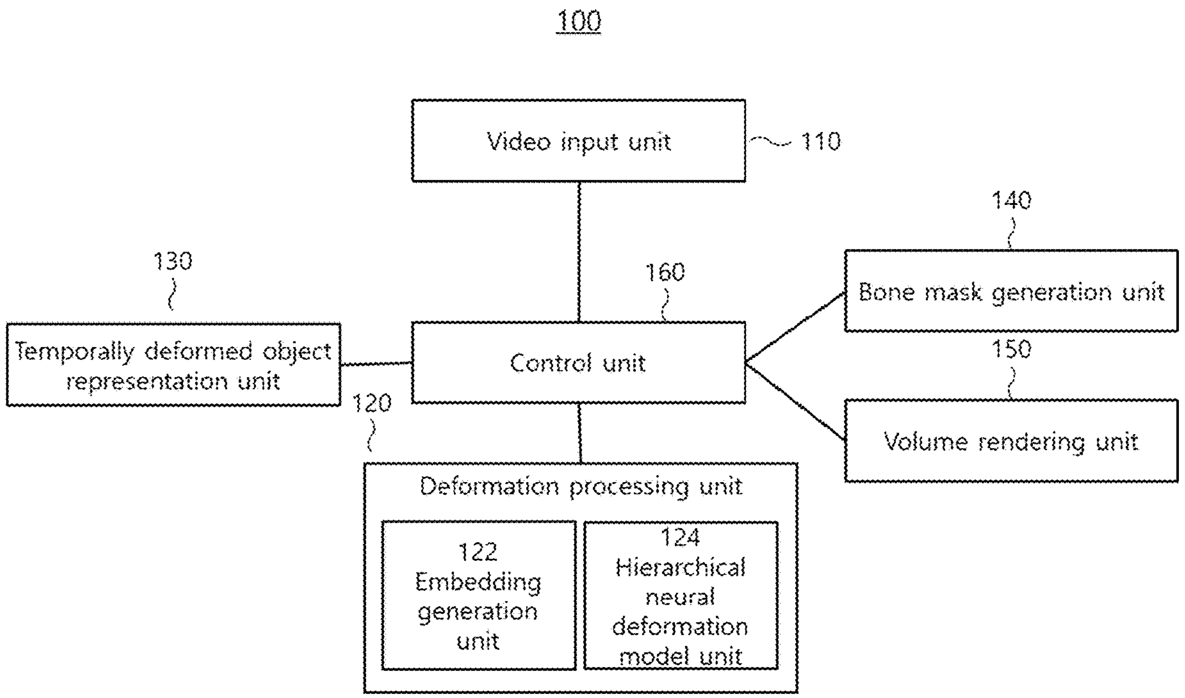
FIG. 2 is a diagram illustrating a functional configuration of the device for reconstructing moving objects in videos using a hierarchical neural deformation model of FIG. 1.

FIG. 2 is a diagram illustrating a functional configuration of the device for reconstructing moving objects in videos using a hierarchical neural deformation model of FIG. 1.

Referring to FIG. 2, the device for reconstructing moving objects in videos using a hierarchical neural deformation model 100 may include a video input unit 110, the embedding generation unit 122, the hierarchical neural deformation model unit 124, and a temporally deformed object representation unit 130.

The embedding generation unit 122 may generate the canonical embedding as a vector representing a basic form and appearance of the object being independent of time and providing a deformation criterion in the canonical space.

More specifically, the embedding generation unit 122 may detect the object in the input video and separate the object from the background. In this case, the embedding generation unit 122 may ascertain the basic boundary and shape of the object to analyze the form of the object. The embedding generation unit 122 may learn a 3D shape and appearance of the detected object to generate a unique state of the object in the canonical space as an embedding vector. This vector may represent a reference state before the object is deformed. The embedding generation unit 122 may provide a criterion for comparing or analyzing states of the object before and after deformation through an embedding that is independent of time and exhibits unique characteristics that do not change regardless of the deformation or motion of the object. The embedding generation unit 122 may output a vector representing the unique state of the object.

The embedding generation unit 122 may generate the time embedding as a vector representing the change of the object for each frame of the video.

More specifically, the embedding generation unit 122 may analyze the change of the object in each frame of the video and detect all state changes (for example, location movement, rotation, or size change) in which the object is moved or deformed. The embedding generation unit 122 may learn the object change detected in each frame and numerically present the deformation of the object over time. The embedding generation unit 122 may generate a vector representing the change of the state of the object in each frame of the video. This vector may reflect all motions and deformations of the object that change over time. For example, the time embedding vector may represent an overall deformation including motions of the arms and legs at each time t in a running motion of a person. The embedding generation unit 122 may output the generated time embedding as a vector representing the deformation of the object in the video over time.

The hierarchical neural deformation model unit 124 may model the motion of the object by combining the canonical embedding with the time embedding to generate a tree-structured bone for the object.

More specifically, the hierarchical neural deformation model unit 124 may generate data for processing the structural characteristics and temporal deformation of the object together by combining the canonical embedding (the basic structure of the object) with the time embedding (deformation information over time). The hierarchical neural deformation model unit 124 may form a tree-structured bone using the generated data, to construct a hierarchical bone system in which a parent bone processes large motions and a child bone processes fine motions. The hierarchical neural deformation model unit 124 may model the motion of the object based on the tree structure. The hierarchical neural deformation model unit 124 may enable the learned model to reproduce the motion of the object more accurately and naturally through a process of optimizing the motion and deformation of the bones through the neural network. The hierarchical neural deformation model unit 124 may output a tree-structured bone and results of modeling the motion of the object through the tree-structured bone.

The hierarchical neural deformation model unit 124 may generate a tree-structured bone as a parent-child bone structure, capture a relatively large motion of the object through the parent bone, and capture a relatively small motion of the object through the child bone.

More specifically, the hierarchical neural deformation model unit 124 may generate a tree-structured bone made of a parent-child relationship by combining the canonical embedding with the time embedding. The hierarchical neural deformation model unit 124 may be configured in such a way that the parent bone processes large motions and the child bone processes fine-grained motions The hierarchical neural deformation model unit 124 may represent the overall motion of the object by capturing motions (for example, a movement of an overall body or swinging of an arm) that occurs in a large part of the object through the parent bones. The hierarchical neural deformation model unit 124 may represent the fine-grained motion of the object more precisely through a process of connecting the child bone to the parent bone and capturing the small motion (for example, motions of fingers, motions of toes) in a finer manner. The hierarchical neural deformation model unit 124 learns the motions between the parent and child bones through the neural network and optimizes the motions to represent the motion of the object more naturally and accurately.

The hierarchical neural deformation model unit 124 may process a coarse level of neural deformation of the object through the parent bone, process a fine level of neural deformation of the object through the child bone, and learn an interaction between the parent and child bones through the neural network.

More specifically, the hierarchical neural deformation model unit 124 may process a deformation that occurs in a large range of the object through the parent bone. This deformation may include the large motion of main parts (for example, arms, legs, and torso) of the object. The hierarchical neural deformation model unit 124 may capture small motions (for example, fingers or toes) of the object in a fine manner by processing small ranges of fine deformations that the parent bone cannot process, through the child bone. The hierarchical neural deformation model unit 124 may learn an interaction between the large motions processed by the parent bone and the small motions processed by the child bone through the neural network. The hierarchical neural deformation model unit 124 may perform optimization by repeatedly learning how the large motion of the parent bone influences the child bone. The hierarchical neural deformation model unit 124 may continuously learn the interaction between the parent and child bones, and output optimized results so that the motion of the object continues naturally even in deformation over time.

The hierarchical neural deformation model unit 124 may determine the time-dependent bone deformation **124*b*** through the skinning weight.

More specifically, the hierarchical neural deformation model unit 124 may connect each point of the object to several bones and set how much each bone influences the point through the skinning weight. Further, the hierarchical neural deformation model unit 124 may also reflect an influence between the parent bone and the child bone in the skinning weights. The hierarchical neural deformation model unit 124 may naturally process the time-dependent deformation by applying bone deformation to the point of the object based on the skinning weight in each time frame. The hierarchical neural deformation model unit 124 may optimize the motion and deformation of the object to be naturally connected through a process of learning the skinning weight in each frame through the neural network.

The hierarchical neural deformation model unit 124 may compute the skinning weight for how much each part of the object is influenced by a specific bone using the linear blend skinning (LBS) technique.

More specifically, the hierarchical neural deformation model unit 124 may compute the influence of each 3D point (for example, a specific point of the skin or a part of the surface) of the object to which each bone is connected, through the LBS technique. The hierarchical neural deformation model unit 124 may determine a final deformation of the point by mixing influences of the bones through the LBS technique.

The hierarchical neural deformation model unit 124 may compute, as a weight, how much the point is influenced by the motion of each bone when each point is influenced by several bones through the LBS technique. The hierarchical neural deformation model unit 124 numerically represents the influence of each bone on a specific part of the object, so that the deformation can be naturally continued in the parent-child bone structure. The hierarchical neural deformation model unit 124 may apply the deformation (for example, rotation or movement) of the bone based on the influence of each bone on each point of the object. The hierarchical neural deformation model unit 124 may apply a larger deformation to a point of a bone with a great skinning weight, and apply a smaller influence to a bone with a small weight.

Since the hierarchical neural deformation model unit 124 smoothly processes the deformation by mixing the influences of several bones through the LBS, the motion of the object may be shown naturally and consistently.

When the parent bone processes the large motion and the child bone processes more the fine motion, the hierarchical neural deformation model unit 124 may compute how much the movements of the parent bone and the child bone influence each part of the object through the skinning weight using the LBS technique and may naturally connect the deformation.

The hierarchical neural deformation model unit 124 may compute how each point of the object is influenced by the motion of the bone over time for each time frame. The hierarchical neural deformation model unit 124 may smoothly apply the time-dependent deformation to each part of the object through the skinning weight.

The temporally deformed object representation unit 130 may reconstruct the temporal deformation of the object the object into the next time-independent bone structure 124*a* through the canonical space.

More specifically, the temporally deformed object representation unit 130 may receive an object deformed over time (an object that has undergone time-dependent bone deformation).

The temporally deformed object representation unit 130 may compare the deformed state of the object with a reference state in a process of reanalyzing the deformed object in the canonical space, and perform processing so that the object can be consistently deformed into a reference structure.

The temporally deformed object representation unit 130 may reconstruct the deformed object into a time-independent bone structure. This structure may represent a basic state of the object that does not change over time, and maintain the state before and after deformation consistently.

The temporally deformed object representation unit 130 may enable the deformation to be naturally continued without change the basic structure even when the object is deformed over time, through a process of maintaining the basic bone structure of the object so that consistent deformation processing is possible in the next time frame after the object is reconstructed.

The device for reconstructing moving objects in videos using a hierarchical neural deformation model 100 may further include the bone mask generation unit 140 that generates a bone mask that detects which region of the object a specific bone influences for the time-dependent bone deformation through a bone occupancy function (BOF).

More specifically, the bone mask generation unit 140 may compute which part of the object each bone influences using the bone occupancy function (BOF), determine whether each 3D point of the object belongs to a specific bone, and numerically represent a space occupied by each bone.

The bone mask generation unit 140 may analyze the influence of the bones on each part of the object over time based on BOF. That is, the bone mask generation unit 140 may compute which part of the object is deformed by a specific bone in the corresponding time frame in consideration of the deformation over time.

The bone mask generation unit 140 may generate the bone mask indicating which region of the object a specific bone influences, based on the BOF computation result. This mask may visually represent a degree to which a specific part of the object is deformed by the bone.

The bone mask generation unit 140 may visually represent the influence of the bone on the object according to the dynamic deformation by updating the bone mask for each time frame when the deformation of the object changes over time.

The device for reconstructing moving objects in videos using a hierarchical neural deformation model 100 may further include the volume rendering unit 150 that performs visualization through dimensional transformation of a temporally deformed object.

More specifically, the volume rendering unit 150 may receive temporally deformed object data. This object exists in 3D and may include a state deformed over time.

The volume rendering unit 150 may compute a 2D pixel value based on density, color, depth information, and the like of each point through a process of performing dimensional conversion for converting 3D data into a 2D image. The volume rendering unit 150 may compute a value corresponding to each pixel using a technique such as ray casting and reflect a depth and structural information of the 3D object in the 2D image.

The volume rendering unit 150 may clearly visually represent internal and external structures of the object by applying transparency, color, shadow, and the like through visualization of the object based on the converted 2D image. The volume rendering unit 150 may update rendering according to each time frame of the temporally deformed object and represent a dynamically deformed state in real time or in a sequence form.

The volume rendering unit 150 may visually transfer a process of deforming the temporally deformed object to the user by outputting a finally rendered image on the screen.

Figure 3:
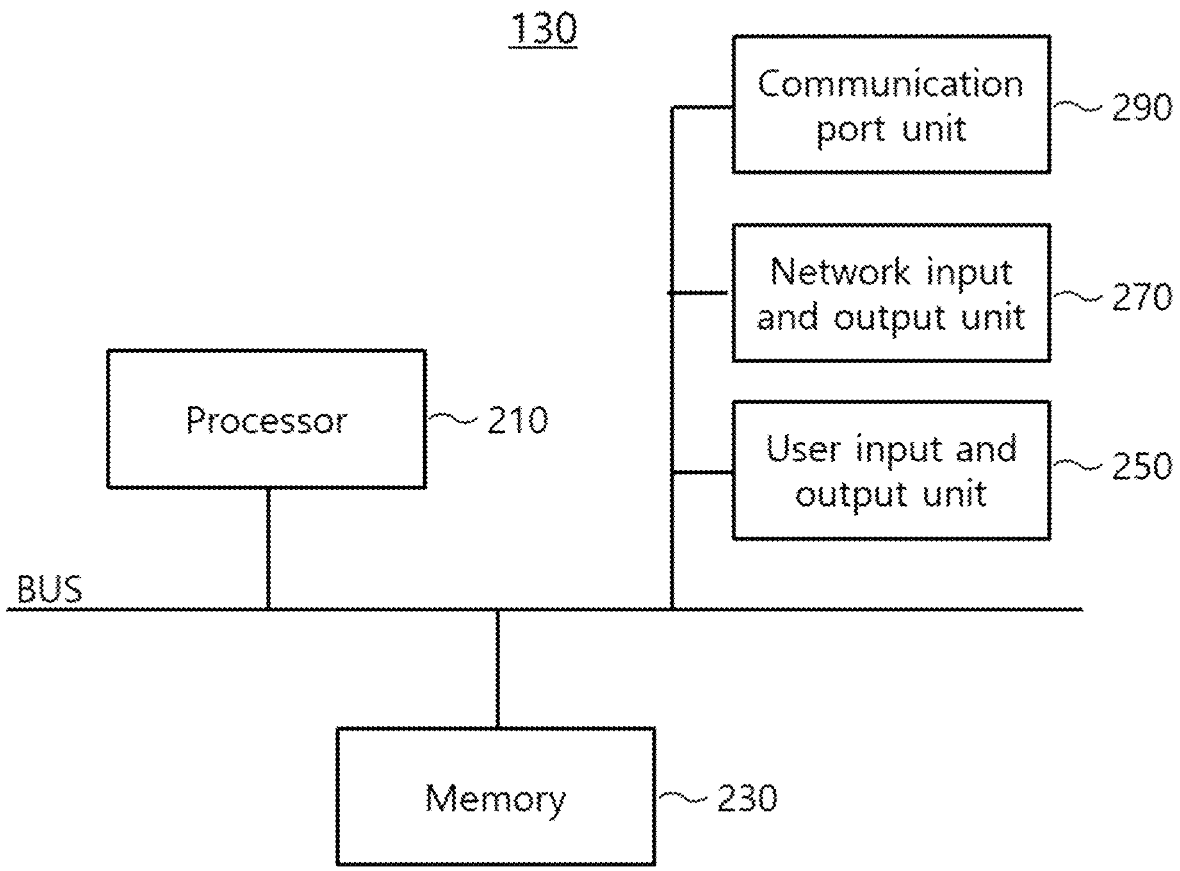
FIG. 3 is a diagram illustrating a system configuration of the device for reconstructing moving objects in videos using a hierarchical neural deformation model of FIG. 1.

FIG. 3 is a diagram illustrating a system configuration of the device for reconstructing moving objects in videos using a hierarchical neural deformation model of FIG. 1.

Referring to FIG. 3, the device for reconstructing moving objects in videos using a hierarchical neural deformation model 100 may include a processor 210, a memory 230, a user input and output unit 250, a network input and output unit 270, and a communication port unit 290.

The processor 210 may receive a question including a video and text through a text-only language model and a vision-language model, generate a text response and a multimodal response to the question, manage the memory 230 in which reading or writing is performed in such a process, and schedule a synchronization time between a volatile memory and a nonvolatile memory in the memory 230. The processor 210 may control an overall operation of the device for reconstructing moving objects in videos using a hierarchical neural deformation model 100, and may be electrically connected to the memory 230, the user input and output unit 250, the network input and output unit 270, and the communication port unit 290 to control data flows between these units. The processor 210 may be implemented as a central processing unit (CPU) or a graphics processing unit (GPU) of the device for reconstructing moving objects in videos using a hierarchical neural deformation model 100.

The memory 230 may include an auxiliary memory device implemented as a non-volatile memory such as a solid state disk (SSD) or a hard disk drive (HDD) and used to store all of data required for the device for reconstructing moving objects in videos using a hierarchical neural deformation model 100, and may include a main memory device implemented as a volatile memory such as a random access memory (RAM). Further, the memory 230 may store a set of instructions that execute a role of the device for reconstructing moving objects in videos using a hierarchical neural deformation model 100 according to the present invention by being executed by the electrically connected processor 210.

The user input and output unit 250 may include an environment for receiving a user input and an environment for outputting specific information to a user, and may include, for example, an input device including an adapter such as a touch pad, a touch screen, a visual keyboard, or a pointing device, and an output device including an adapter such as a monitor or a touch screen. In an embodiment, the user input and output unit 250 may correspond to a computing device connected via a remote connection, and in such a case, the device for reconstructing moving objects in videos using a hierarchical neural deformation model 100 may function as an independent server.

The network input and output unit 270 may provide a communication environment for connection to an attack IP terminal or a test IP terminal through a network, and may include, for example, an adapter for communication such as a local area network (LAN), a metropolitan area network (MAN), a wide area network (WAN), and a value added network (VAN). Further, the network input and output unit 270 may be implemented to provide a short-distance communication function such as WiFi or Bluetooth or a wireless communication function of 4G or higher for wireless transmission of data.

The communication port unit 290 is a hardware interface for connection to external hardware, and for example, the external hardware may include a printer, a mouse, and USB hardware. The communication port unit 290 may detect a connection of specific USB hardware to perform a role of a CTI augmentation device 130.

Figure 4:
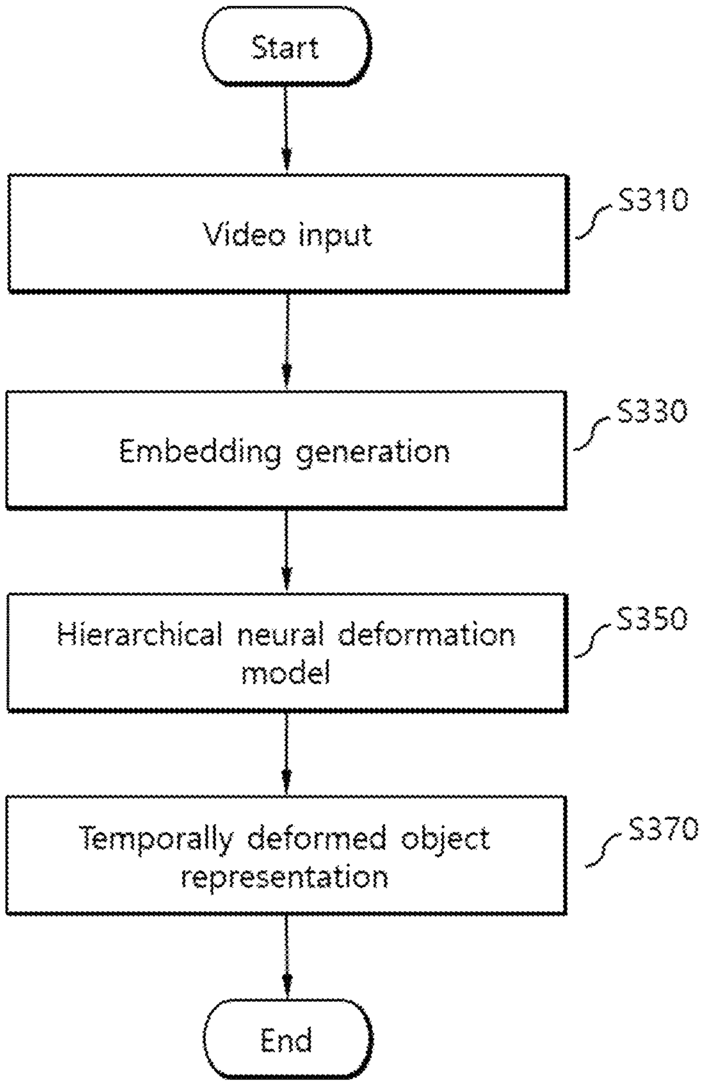
FIG. 4 is a flowchart illustrating a method for reconstructing moving objects in videos using a hierarchical neural deformation model according to the present invention.

FIG. 4 is a flowchart illustrating a method for reconstructing moving objects in videos using a hierarchical neural deformation model according to the present invention.

In FIG. 4, the device for reconstructing moving objects in videos using a hierarchical neural deformation model 100 performs a video input step of receiving a video (step S310), an embedding generation step of generating a canonical embedding and a time embedding for an object in the video (step S330), a hierarchical neural deformation model step of receiving the canonical embedding and the time embedding, capturing the coarse-to-fine hierarchical neural deformations of the object, and outputting the time-independent bone structure 124*a* and the time-dependent bone deformation 124*b* of the object through a neural network (step S350), and a temporally deformed object representation step of representing the temporal deformation of the object as a temporally deformed object in the canonical space based on the time-independent bone structure 124*a* and the time-dependent bone deformation 124*b* of the object (step S370).

In step S310, the video input unit 110 may perform processes such as decoding, frame extraction, and preprocessing to efficiently process video data. In this process, the video input unit 110 may transform the input video data into a processable format and transfer the video data to the next step.

In step S330, the embedding generation unit 122 may generate the canonical embedding and the time embedding, represent a basic form and the deformation over time of the object to accurately analyze a deformed state of the object in the video, and prepare so that a motion and deformation of the object can be naturally processed in subsequent processing.

In step S350, the hierarchical neural deformation model unit 124 may naturally model the motion of the object in the video and precisely analyze the dynamic deformation of the object through a process of combining the canonical embedding with the time embedding to process the coarse-to-fine deformations of the object and outputting the time-independent bone structure 124*a* and the time-dependent bone deformation 124*b*.

In step S370, the temporally deformed object representation unit 130 may consistently process the dynamic deformation of the object and clearly represent the deformed state over time through a process of processing the temporal deformation in the canonical space to represent the temporal deformation as a temporally deformed object, based on the time-independent bone structure 124*a* and the time-dependent bone deformation 124*b*.

1. Proposed Method

An goal of this technology is to construct a framework for creating a 3D animatable joint object from casual videos. This framework provides structured bones to help make object manipulation easier.

The overall process is described in FIG. 1, and is an extension of an existing BANMo framework, with a core differences being a hierarchical deformation model and a bone occupancy function.

1.2. Introduction

BANMo proposes a method for restoring an animatable 3D model from a RGB video through an NeRF framework. This method includes a time-invariant canonical model and a time-varying deformation model, and the deformation is defined by ellipsoidal bones and a neural network skinning weight module. Given a monocular RGB video, the bones serve to deform the rays into a canonical pose at each frame.

The canonical model then represents the shape and appearance of the deformed rays in the canonical pose. All components are deformed into the canonical space, which is represented as $x_{ai}=T_t \rightarrow c\ x_{ti}$. The color $c_i$ and density $\sigma_i$ of the deformed points in the canonical space are queried in the canonical model. These values are synthesized in color via volume rendering.

The canonical model represents the shape and appearance of the object like NeRF. The canonical model receives a 3D point $x_a=(x, y, z)$ and a viewing direction $d=(\phi, \theta)$ and outputs a color $c=(r, g, b)$ and a density o. According to VolSDF, an SDF value s for mesh extraction is generated, and s is transformed to $\sigma=\alpha$.

$$\hat{C}(r^t) = \sum_{i=1}^{N} \tau_i(1-\exp(-\sigma_i\delta_i))c_i, \tag{1}$$

Here, $\tau=\exp(-\Sigma(\sigma j*\delta j))$ represents a accumulated transmittance, and di is a distance between adjacent samples. All components are optimized by minimizing a color difference between a rendered frame and a given video.

1.2. Hierarchical Neural Deformation Model

To represent motions with coarse-to-fine granularity, a hierarchical neural deformation model was introduced (see FIG. 1(*b*)). This model receives the time embedding vector for each frame and generates a neural bone hierarchy for the frame. The neural bone hierarchy defines bones as a Gaussian ellipsoid, where the parent bone captures coarse motions in a larger region, and the child bones capture fine-grained motions in a more specific part.

To deform a 3D point $x_t$ into the canonical space, the pose $P_t=\{T_{t1}, \ldots, T_tB\}$ of a leaf bone of the neural bone hierarchy is compute at time t. Here, $T_tb \in SE(3)$ represents a rigid transformation parameters constructed through a bone hierarchy for a b-th bone. From the parameters, mapping between $P_t$ and the canonical pose $P_a$ is defined.

$$T_b^{t\to c} = T_b^c \cdot (T_b^t)^{-1},\ T_b^{c\to t} = T_b^t \cdot (T_b^c)^{-1}. \tag{2}$$

Then, the skinning weight $w(x_t,P_t)$ of $x_t$ is computed through the skinning weight module. A backward warping matrix $W_t \rightarrow c_x$ from time t to the canonical space is defined by a linear blend skinning (LBS) method using w and T.

$$W^{t\to c} = \sum_{b=1}^{B} w_b(x^t, P^t)\cdot T_b^{t\to c}, \tag{3}$$

Here, $w_a$ denotes a b-th dimension of w. With a warping field, $x_t$ is deformed into the canonical space, which is represented as $x^c=W_t \rightarrow c\ x_t$. Since a rigid transformation Tis invertible, the forward warping matrix is computed from the canonical space to time t.

$$W^{c\rightarrow t} = \sum_{b=1}^{B} w_b(x^c, P^c)\cdot T_b^{c\rightarrow t}. \tag{4}$$

None Hierarchy

Figure 5A:
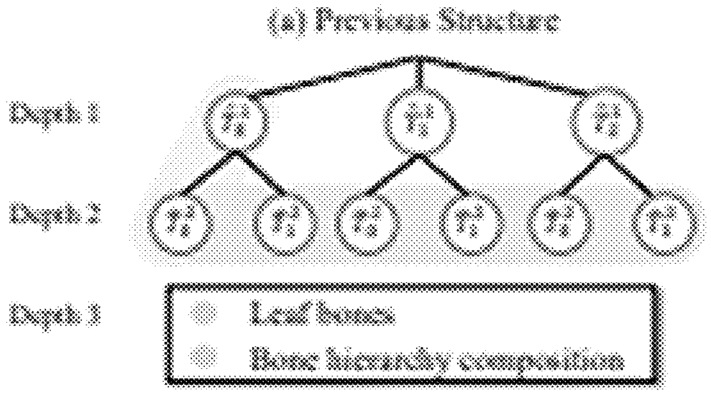
FIGS. 5A-5C are diagrams illustrating a bone hierarchy of the device for reconstructing moving objects in videos using a hierarchical neural deformation model of FIG. 1.
Figure 5B:
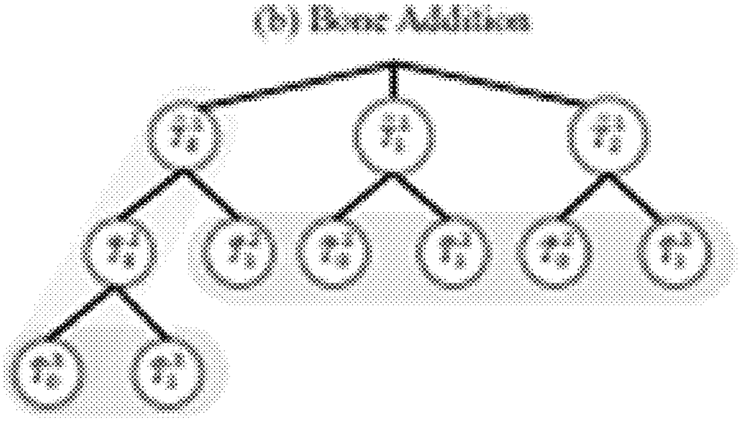
Figure 5C:
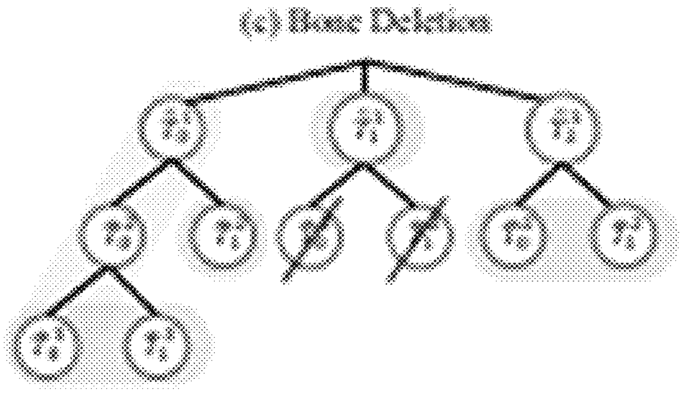

In order to structurally represent the motions, the neural network bones are organized into a tree structure. Here, the child bone inherits the motions of their parent bone before performing fine-grained motions. The diagrams of the bone hierarchy are illustrated in FIGS. 5A-5C. Specifically, a final transformation T of a specific bone at a depth d is constructed in a world coordinate system by recursively left-multiplying corresponding parent transformations at previous depths.

$$T^d = \hat{T}^1\hat{T}^2 \ldots \hat{T}^{d-1}\hat{T}^d, \tag{5}$$

Here, Tod represents a local transformation of the bone at the depth d. Since the transformation defines the center and orientation of the bone, this structure ensures that the child bone is defined in a local coordinate system of the parent. Starting with a small number of bones at a depth 1, each bone is split into child bones with fine-grained motions in smaller regions as the optimization progresses.

Neural Bone Representation

According to previous studies, a 3D Gaussian ellipsoid is used as primitive of the bone. Each bone consists of a rotation matrix $R\in\mathbb{R}^{3\times3}$, a center $t\in\mathbb{R}^3$ at each time step, and a scale vector $s\in\mathbb{R}^3$ that is shared across all time steps. These values are regressed by the MLP f on the embedding vector $e_t$ for each time step t. For each depth, MLP $f_e$ is used separately, receiving an embedding $e_t$, d of the previous parent bone and a root embedding $e_t$, 1 representing a global motion. The local transform matrix $T\hat{}_i$ of the i-th bone may be described as follows.

$$\hat{T}_i^{t,1}, s_i^{t,1} = f_i^1(e^{t,1}),\ \hat{T}_i^{t,d}, s_i^{t,d} = f_i^d([e^{t,1}, e^{t,d-1}]), \tag{6}$$

Here, $f^d_i$ denotes an i-th dimension of the MLP output that regresses the bones at the depth d, and i means a local index of the bone within the parent. The MLP $f^d$ outputs geometric attributes of all child bones at the depth d.

Skinning Weight Module

Each point x is deformed by linear blend skinning (LBS) using the transformation of the leaf bones. The skinning weight of the b-th leaf bone is defined as follows.

$$w_b = \frac{\exp(-d_M(x, b) + \Delta w_b)}{\sum_{i=1}^{B}\exp(-d_M(x, b) + \Delta w_b)}, \tag{7}$$

$$d_M(x, b) = \sqrt{(x-t_b)^T R_b^T S_b R_b (x-t_b)}, \tag{8}$$

Here, dM(x, b) denotes the Mahalanobis distance between x and the b-th ellipsoidal bone, and Δwb is a delta skinning weight computed via the MLP.

Manipulation

With the optimized model, the user can manipulate the object into a desired pose. To this end, the canonical mesh is extracted by querying the canonical model applying a Marching Cube algorithm. The manipulation of broad movements, including the motion of multiple sub-parts, is achieved by adjusting the parent bone, while a finely tuned motion can be easily achieved by adjusting only the sub-bones. The canonical mesh is deformed using forward warping in Formula. (4) with a new transformation parameter.

1.3 Regularizing with Bone Occupancy Function

One of the challenges in constructing a bone hierarchy is to determine the location and shape of the bone. Previous studies have used Sinkhorn divergence to regulate the center of the bones, but orientations and scales remain under-constrained. As a result, the bones are scattered on the object surface or often larger than the object, hindering interpretability and subdivision into finer regions. To address this challenge, regularization terms for aligning the properties (center, orientation, and scale) of the bones with the shape of the object are proposed, which are motivated by part-based generation methods. Core element of this regularization is the bone occupancy function, which uses the Mahalanobis distance dM(x, b) used in the skinning weight module to identify occupancy.

Bone Occupancy

First, a bone occupancy function gb of determining a relative location with respect to the bone surface is modeled.

$$g_b(x) = d_M(x, b) - \gamma_b, \tag{9}$$

Here, γ is a predefined threshold. Points inside the bone yield negative values for g(x), while points outside the bone results in positive values. g(x) is transformed into a density function σ(−g(x)/τ), which has a value close to 1 when x is inside the bone. Here, o is a sigmoid function and τ is a temperature value for determining the sharpness of the boundary. The bone occupancy function provides a way to connect the bone location with the shape of the object.

Skeleton Mask

To determine whether the 3D point x is inside any bone, the gb(x) of all bones are aggregated to define a unified bone occupancy function G(x).

$$G(x) = \min_{b\in1,\ldots,B} g_b(x). \tag{10}$$

With the density obtained from G(x), the 2D bone mask Mbone is constructed by accumulating the density values along the ray. The bone mask loss is compared with the object mask MGT and calculated as follows:

$$\mathcal{L}_{bone} = \sum \|M_{bone} - M_{GT}\|^2. \tag{11}$$

Using regularization through the bone mask loss, the location and shape of the bone are constrained to align with the actual shape of the object.

Overlap and Coverage Loss

The properties of the bones are further canonical based on the bone occupancy function. The Marching Cube algorithm is applied to an output of the canonical model gc(•) to extract surface points V. From the points in V, an overlap loss is applied, enforcing that each point is occupied by a maximum of A number of bones.

$$\mathcal{L}_{overlap} = \frac{1}{|V|}\sum_{x\in V}\max\left(0, \sum_{b=1}^{B}\sigma\left(\frac{-g_b(x)}{\tau}\right) - \lambda\right). \tag{12}$$

Further, a coverage loss is applied to ensure that each bone occupies a certain portion of the entire region.

$$\mathcal{L}_{cover} = \sum_{b=1}^{B}\sum_{x\in N}(\max(0, g_b(x))), \tag{13}$$

Here, N denotes the N closest points among V with respect to the Mahalanobis distance dM(x, b) to the bone.

1.4 Optimization

The overall system is optimized on a given monocular RGB video, including 2D masks, optical flow, and dense-CSE features extracted from them. In BANMo, a reconstruction loss term Lrecon and a cycle loss term Lcycle are computed, and additional loss terms related to the bones are combined for optimization.

$$\mathcal{L} = \mathcal{L}_{recon} + \mathcal{L}_{cycle} + \mathcal{L}_{bone} + \mathcal{L}_{overlap} + \mathcal{L}_{cover}. \tag{14}$$

Optimization from Coarse-to-Fine Motion

To optimize a hierarchical neural deformation system, a coarse-to-fine-grained motion optimization scheme is proposed. Initially, depth-1 bones that are responsible for coarse motion with a larger region are optimized. During an optimization process, child bones are gradually added to previous bones to progressively capture fine-grained motions.

Implementation Details

The optimization process starts with five initial bones for animals and six initial bones for humans. After the initial bones (parent bones) are set, two additional child bones are added to each existing bones in subsequent stages. Optimization of each depth involves 20,000 iterations. The optimization is performed using two NVIDIA Geforce RTX 3090 GPUs, and each stage is completed within 3 hours in the environment.

2 Experiments 2.1 Experimental Setup

Dataset

The method is evaluated on various categories of objects, including humans and animals. An AMA Human dataset includes multi-view videos obtained by capturing actor performances. For evaluation on humans, Swing and Samba sequences are used and treated as monocular videos. For the animals, Eagle and Cat data from the BANMo dataset is used. Eagle contains videos rendered as an animated 3D eagle model, while Cat contains casually captured monocular videos. In a preprocessing phase, object masks, optical flow, and CSE features are extracted using models such as PointRend, VCN-robust, and CSE. Quantitative evaluation is performed by using Swing, Samba, and Eagle videos, and compared with the ground-truth 3D mesh. Evaluation Metrics The quality of the reconstructed 3D object is evaluated based on the following criteria. A chamfer distance (CD) measures an average distance between the ground-true mesh and the estimated surface points. Additionally, an F-score (F2) is measured at a 2% distance threshold of the longest edge of the axis-aligned object bounding box. Due to the scale ambiguity, the estimated 3D mesh is aligned to the ground-true mesh using iterative closest point (ICP) before evaluation.

Comparison Target

Results are compared with a template-free method and a bone-based method. ViSER reconstructs 3D articulated objects by learning deformation parameters guided by video-specific surface embeddings. The methods use 36 ellipsoidal bones for optimization. BANMo estimates the pose of objects using Gaussian ellipsoidal bones and canonical NeRF, and uses 25 bones for all categories of objects. CAMM applies kinematic chains from RigNet on top of BANMo to solve a problem of Gaussian bone manipulation. Finally, RAC reconstructs category-level 3D models. RAC uses a predefined bone and learns to capture video-specific morphology from various objects within the same category.

2.2 3D Restoration

Quantitative Comparison

First, the 3D restoration results are quantitatively evaluated for various categories of objects. For fair comparisons, reproduced results of BANMo and original results reported in the paper are provided. Since the Eagle dataset does not have a bone, the results of RAC on Eagle are omitted. As shown in Table 1, the method outperforms template-free methods on all datasets. Further, the method achieves comparable results to bone-based baselines without using predefined structural knowledge. In particular, the method achieves comparable or better results on Eagle while using fewer control points compared to other baselines. The method uses only 10 leaf bones for Eagle, while other baselines use 25 or more bones to represent the deformation. This shows that the structured deformation model effectively captures motions with fewer control points to obtain excellent results, and has the potential to improve user manipulation interfaces.

TABLE 1

Quantitative results on Eagle and AMA.

| | ViSER | | BANMo | | BANMo(r) | | CAMM* | | RAC* | | Ours | |
|---|---|---|---|---|---|---|---|---|---|---|---|---|
| Method | CD | F2 | CD | F2 | CD | F2 | CD | F2 | CD | F2 | CD | F2 |
| Eagle | 19.22 | 24.76 | 8.1 | 56.7 | 4.66 | 81.44 | 4.50 | 81.21 | — | — | 4.64 | 81.59 |
| Swing | 16.29 | 19.95 | 9.1 | 57.0 | 7.33 | 64.88 | 9.02 | 56.00 | 6.10 | 70.33 | 7.11 | 65.88 |
| Samba | 23.28 | 22.47 | — | — | 7.22 | 64.99 | 7.50 | 62.17 | 6.63 | 67.71 | 6.15 | 72.07 |

*indicates methods that utilize predefined skeletons for optimization.

(r) indicates reproduced results.

Qualitative Comparison

Figure 6:
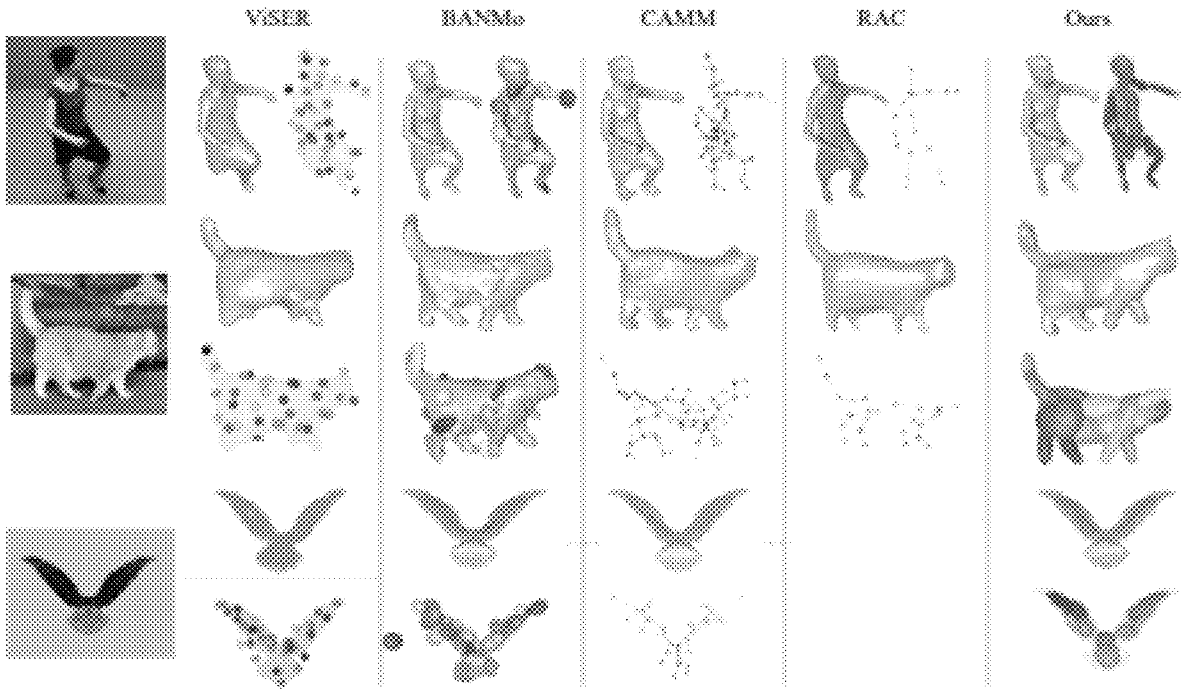
FIG. 6 is a diagram illustrating a qualitative comparison between template-free methods (ViSER and BANMo) and skeleton-based methods (CAMM and RAC) in the device for reconstructing moving objects in videos using a hierarchical neural deformation model of FIG. 1.

FIG. 6 shows 3D restoration results on the Samba, Cat, and Eagle datasets. The method accurately reconstructs the 3D models with details. ViSER shows inaccurate poses and over-smoothed results, which may be due to use of explicit meshes as a shape model, and lack of capability to aggregate multiple videos. On the other hand, the method utilizing NeRF and multiple videos achieves excellent reconstruction results. Methods (RAC and CAMM) that handle deformation using predefined bones generally capture poses well. However, the methods have difficulty in accurately representing fine-grained motions that are absent in the template, such as details such as skirts in the Samba dataset.

Control Point Comparison

Figure 9A:
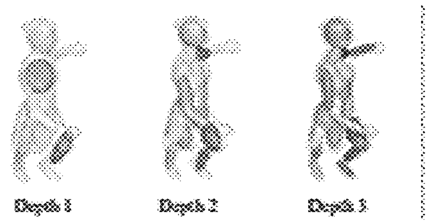
FIG. 9A is a diagram illustrating a visualization of hierarchically structured bones at each depth.
Figure 9B:
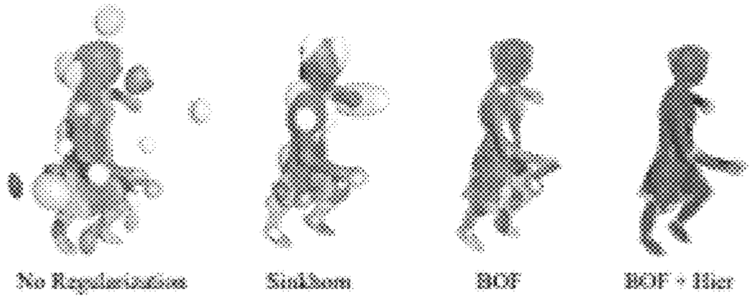
FIG. 9B is a diagram illustrating qualitative ablation results for bone regulation items in the device for reconstructing moving objects in videos using a hierarchical neural deformation model of FIG. 1.

To illustrate the interpretability of the framework, the control points of the various methods are visualized in FIG. 6. For simplicity, the results shows only the visualized leaf bones, and bones sharing the same parent are shown in the same color. As can be seen, the bones are aligned within a body of the object, and each sufficiently covers the parts of the object. The coarse bones capture parts of the object in a broader range, such as an upper body of the Samba or wings of the Eagle. Child bones in deeper levels subdivide the coarse parts to represent fine-grained motions in specific components of the object. This can also be clearly seen in FIG. 9A, where bones assigned to the same parent show strong correlations in movements.

On the other hand, resulting control points of BANMo are scattered over the object surface and do not consider the structure or the granularity of motions, which makes it difficult to understand and animate the 3D model. The bone hierarchy in the system provides organized control points for deformation to enhance the understanding of the control, and a user-friendly manipulation experience.

2.3 Neural Rendering

Figure 7A:
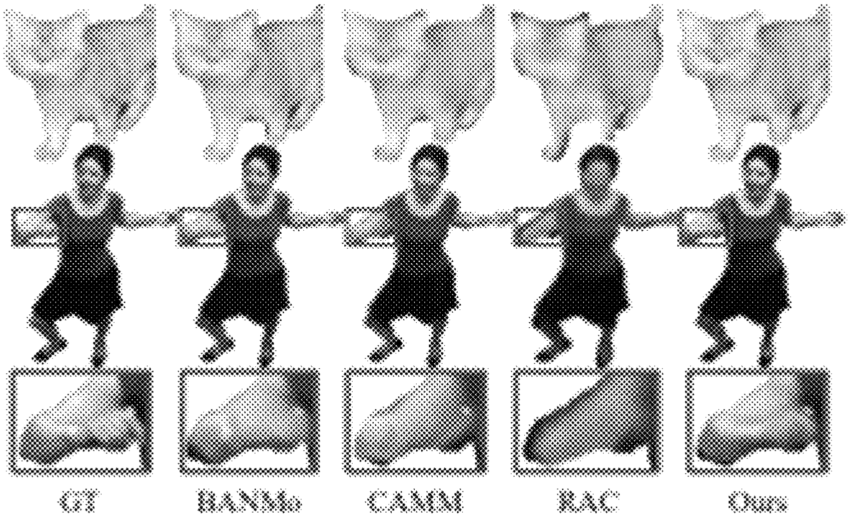
FIG. 7A is a diagram illustrating a qualitative comparison for neural rendering results.

Rendering results are compared with NeRF-based methods. For quantitative evaluation, the PSNR and SSIM scores between the rendering results and the ground-true images are measured. As shown in Table 2, the method outperforms all criteria in various object categories, showing that hierarchical motion modeling improves the rendering quality. FIG. 7A shows rendering results on Cat and Samba datasets. As evident from the fine motions of the arm highlighted in a blue box, the method effectively captures complex motions and provides clearer RGB renderings.

TABLE 2

Quantitative comparison on neural rendering.

| | Swing | | Samba | | Eagle | | Cat | |
|---|---|---|---|---|---|---|---|---|
| | PSNR | SSIM | PSNR | SSIM | PSNR | SSIM | PSNR | SSIM |
| BANMo | 29.53 | 0.921 | 30.72 | 0.916 | 31.05 | 0.900 | 28.01 | 0.650 |
| CAMM | 28.04 | 0.912 | 26.87 | 0.907 | 30.44 | 0.894 | 20.47 | 0.830 |
| RAC | 22.82 | 0.878 | 23.90 | 0.878 | — | — | 18.25 | 0.782 |
| Ours | 30.43 | 0.938 | 31.74 | 0.942 | 32.63 | 0.924 | 28.45 | 0.859 |

2.4 Reanimation

The reanimation capability and the effectiveness of the learned control points are compared with BANMo. To this end, optimization-based motion retargeting experiments are performed according to previous studies. Given canonical shapes and corresponding bone parameters, the objective is to retarget the pose of the model to a new target pose through bone adjustments. Specifically, the transformation parameters of bones are optimized to minimize a chamfer distance (CD) between a predicted shape and a target shape while preserving the canonical shape and skinning weights. A correct mesh of Samba is rigged and a sequence of 150 frames depicting a novel motion is crafted. Results of various optimization steps (per frame) are also provided to illustrate a speed at which the target pose is achieved.

Figure 7B:
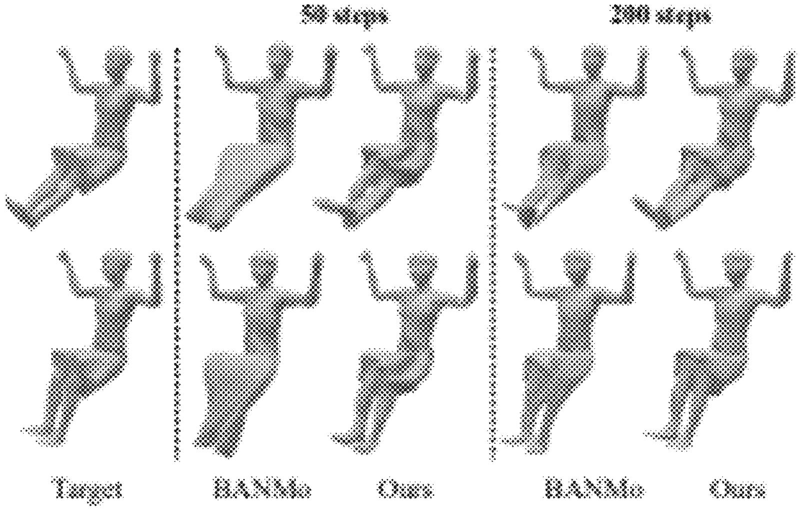
FIG. 7B is a diagram illustrating a qualitative comparison for a retargeted object in the device for reconstructing moving objects in videos using a hierarchical neural deformation model of FIG. 1.

As illustrated in FIG. 7B, convincing results are achieved even with fewer optimization steps. This is due to the structured property of moving larger regions simultaneously with similar motions. As the number of steps increases, details of the pose become more refined. On the other hand, BANMo struggles with handling the large motions (for example, seating as in the first pose), leading to collapsed body structures. Table 3 provides a quantitative comparison of the retargeted objects. This outperforms the baseline method at all steps, particularly with a significant margin in a small number of steps, which means that the method has better animation capabilities.

TABLE 3

Quantitative comparison (CD) of the retargeted objects.

| #steps | 50 | 100 | 150 | 200 |
|---|---|---|---|---|
| BANMo | 2.75 | 2.03 | 1.90 | 1.86 |
| Ours | 2.15 | 1.93 | 1.83 | 1.75 |

2.5 Manipulation

Figure 8:
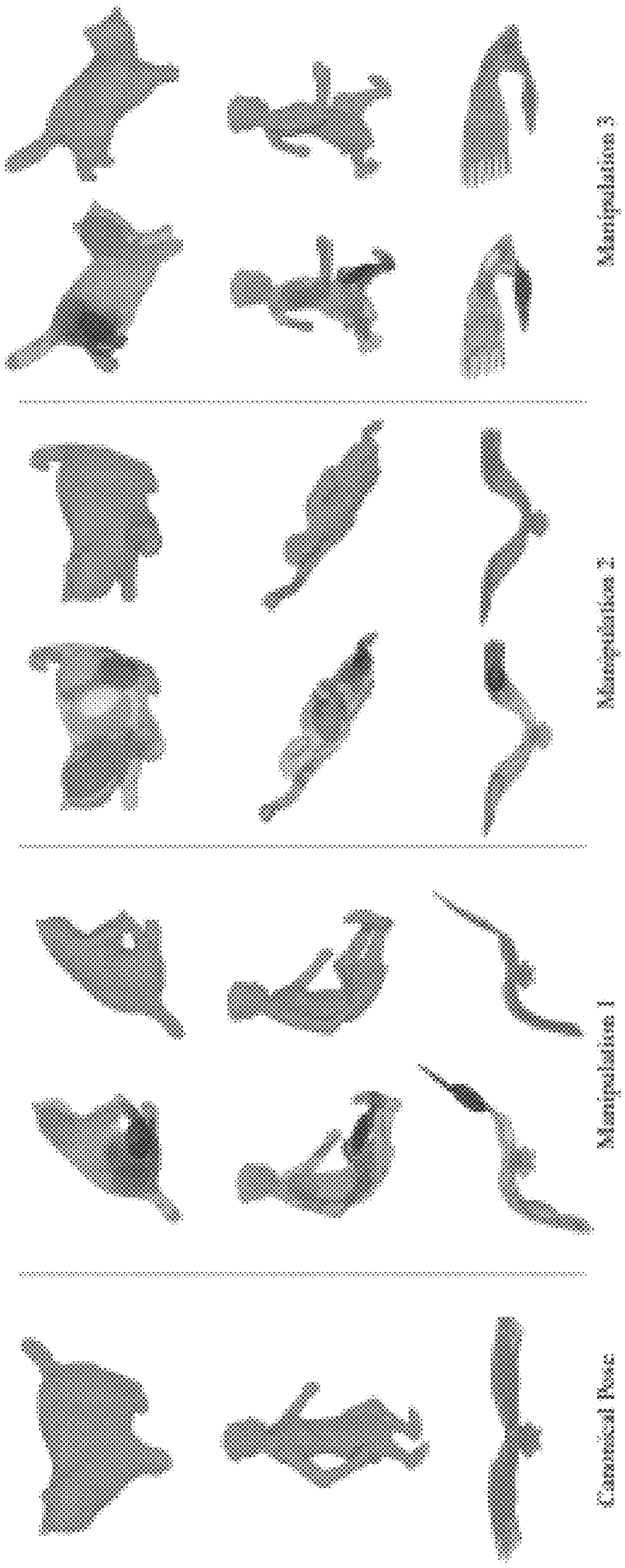
FIG. 8 is a diagram illustrating results of manipulation of various categories of objects in the device for reconstructing moving objects in videos using a hierarchical neural deformation model of FIG. 1.

The capability of the method capable of manipulating various objects is demonstrated. A core advantage of the approach is that the approach allows coarse-to-fine manipulations, making manipulation easier for users. FIG. 8 provides an example of the manipulation results using the framework. Due to tree-structured control points, various poses can be animated with a minimal number of actions. For example, only depth-1 bones (coarsest level) are used with only five operations to animate a human and a cat in a sitting pose. On the other hand, unstructured bones of BANMo require independent manipulation of bones to create the same pose, which requires a total of 25 operations.

Further, since the deformation model gradually captures the coarse-to-fine structures of the motions, bones may be flexibly added or deleted if necessary (see FIGS. 5A-5C). When the user wants to add more control points to the tail of the cat to better capture fine motions, this can be easily achieved by adding child bones to the corresponding bone. Such dynamical control of the number of bones is not feasible within the framework of BANMo. This is because BANMo lacks the structure, making it difficult to determine a location of a new bone.

2.6 Ablation Study

Hierarchical Neural Deformation Model

Experiments were performed by gradually increasing the depth (number of depths=1, 2, 3) to ablate the hierarchical neural deformation model. This was compared with the model without the hierarchy system that uses the same number of bones at a single depth (number of bones=12, 24). As reported in Table 5, the model with the hierarchy system showed much better quantitative results even with the same number of bones. This indicates that capturing coarse motions at the beginning and gradually refining fine-grained motions is more effective for motion optimization. This gradual procedure will be better described in FIG. 9A. In the case of Samba, the system initially assigns one bone to an entire leg. As the depth increases, this coarse bone is subdivided into finer parts, such as a calf and a foot, providing a correlation between bones with similar motions.

TABLE 4

Ablation results on the number of videos.

| | 1 vid | | 4 vids | | 8 vids | |
|---|---|---|---|---|---|---|
| #videos | CD | F2 | CD | F2 | CD | F2 |
| CAMM | 17.93 | 38.52 | 10.65 | 48.72 | 7.50 | 62.17 |
| BANMo | 10.28 | 47.70 | 11.34 | 45.20 | 7.22 | 64.99 |
| Ours | 9.92 | 52.29 | 7.05 | 62.34 | 6.15 | 72.07 |

A novel framework for generating and animating a 3D model from a set of routinely captured videos was presented.

TABLE 5

Quantitative ablation results on the number of depths and the regularization.

| Bone reg. | | No reg. | | Sinkhorn | | Bone occupancy function | | | | |
|---|---|---|---|---|---|---|---|---|---|---|
| (#depths, #bones) | | (1, 6) | (1, 24) | (1, 6) | (1, 24) | (1, 6) | (1, 12) | (1, 24) | (2, 12) | (3, 24) |
| Samba | CD | 7.66 | 6.84 | 8.56 | 7.17 | 7.65 | 7.21 | 7.16 | 6.87 | 5.15 |
| | F2 | 61.38 | 67.66 | 57.23 | 65.67 | 61.93 | 63.78 | 65.41 | 66.76 | 72.07 |
| Swing | CD | 8.96 | 8.37 | 9.60 | 8.39 | 9.27 | 9.37 | 8.83 | 7.74 | 7.11 |
| | F2 | 55.61 | 59.39 | 52.91 | 59.70 | 54.74 | 54.34 | 58.29 | 61.64 | 65.88 |

Bone Regularization

Ablation experiments on bone regularization items were performed. Three models below were compared. (1) A model with no regularization, and (2) a model optimized with Sinkhorn divergence as in previous studies. To explore this effect more clearly, these models were compared without a hierarchy system (number of depths=1). Results using 6 and 24 bones, respectively, were provided, which represent an insufficient number of bones and a sufficient number of bones to capture motions, respectively. Table 5 and FIG. 7B show quantitative and qualitative results. The model regulated with the bone mask loss achieves better results compared to the Sinkhorn divergence loss. Interestingly, in some cases, the model with no regularization provides the best results. However, as illustrated in FIG. 7B, bones optimized in a state of no regularization tend to float outside a body, making it difficult to distinguish the responsibility of the bones for a specific part. Bones regulated by bone regulation effectively capture motions at more appropriate locations, and yield greater improvements when combined with a hierarchy system.

Number of Input Videos

Finally, the performance under a limited number of videos was investigated. Results using a single video (1 vid), half videos (4 vids), and all videos (8 vids) on a Samba dataset were compared. As shown in Table 4, the method outperforms the baseline method in all settings. BANMo struggles with correctly restoring the model when using a small number of videos because the control points lack a structure. On the other hand, the method outperforms BANMo (8 vids) even when only half videos (4 vids) are used, and this shows how powerful and effective the structured deformation model is.

The hierarchical neural deformation model provides a method of acquiring a structured bone representations without utilizing prior structural knowledge. This enables the general applicability of this method. Further, the method promotes easier and more interpretable manipulations in combination with regularization based on a bone occupancy function. The approach relaxes requirements for obtaining an animatable model for arbitrary objects, and provides more comprehensive control points so that the control points act as true "control points".

Although the preferred embodiments of the present invention have been described above, it will be understood by those skilled in the art that the present invention can be variously modified and changed without departing from the scope and spirit of the present invention described in the claims below.

[National Research and Development Project Supporting the Present Invention]

Project Serial No: 2710006677
Project No: RS-2020-II201361
Name of department: Ministry of Science and ICT
Task management (professional) institution name: Institute of Information and Communications Technology Planning and Evaluation
Research Project Name: Nurturing ICT and Broadcasting Innovation Talents (R&D)
Research Task Name: Artificial Intelligence Graduate School Support Project (Yonsei University)
Name of task performing organization: University Industry Foundation, Yonsei University
Research Period: 2024.01.01~2024.12.31
Project Serial No: 2710008564
Project No: RS-2022-II220124
Name of department: Ministry of Science and ICT
Task management (professional) institution name: Institute of Information and Communications Technology Planning and Evaluation (National Research Foundation of Korea)
Research Project name: Information and Communication/Broadcasting Research and Development Project Research Task Name: Development of Artificial Intelligence Technology for Recognizing and Utilizing One's Learning Capability to Provide Appropriate Results
Name of task performing organization: University Industry Foundation, Yonsei University
Research Period: 2024.01.01~2024.12.31
Project Serial No: 1711182591
Project No: 2022R1A2C2004509
Name of department: Ministry of Science and ICT
Task management (professional) institution name: National Research Foundation of Korea
Research Project name: Mid-career Researcher Support Project
Research Task Name: Development of Online Temporal Behavior Detection Technology for Real-time Streaming Video Understanding
Name of task performing organization: University Industry Foundation, Yonsei University
Research Period: 2024.03.01~2025.02.28

DETAILED DESCRIPTION OF MAIN ELEMENTS

100: Device for reconstructing moving objects in videos using a hierarchical neural deformation model
110: Video input unit
120: Deformation processing unit
130: Temporally deformed object representation unit
140: Bone mask generation unit
150: Volume rendering unit
122: Embedding generation unit
124: Hierarchical neural deformation model unit

What is claimed is:

1. A device for reconstructing moving objects in videos using a hierarchical neural deformation model, comprising:

a video input unit configured to receive a video;

an embedding generation unit configured to generate a canonical embedding and a time embedding for an object in the video;

a hierarchical neural deformation model unit configured to receive the canonical embedding and the time embedding, capture coarse-to-fine hierarchical neural deformations of the object, and output a time-independent bone structure and a time-dependent bone deformation of the object through a neural network; and a temporally deformed object representation unit configured to represent the temporal deformation of the object as a temporally deformed object in a canonical space based on the time-independent bone structure and the time-dependent bone deformation of the object.

2. The device for reconstructing moving objects in videos using a hierarchical neural deformation model of claim 1, wherein the embedding generation unit generates the canonical embedding as a vector representing a basic form and appearance of the object being independent of time and providing a deformation criterion in the canonical space.

3. The device for reconstructing moving objects in videos using a hierarchical neural deformation model of claim 2, wherein the embedding generation unit generates the time embedding as a vector representing object change for each frame of the video.

4. The device for reconstructing moving objects in videos using a hierarchical neural deformation model of claim 1, wherein the hierarchical neural deformation model unit combines the canonical embedding with the time embedding to generate a tree-structured bone for the object, and models the motion of the object.

5. The device for reconstructing moving objects in videos using a hierarchical neural deformation model of claim 4, wherein the hierarchical neural deformation model unit generates a tree-structured bone as a parent-child bone structure, captures a relatively large motion of the object through the parent bone, and captures a relatively small motion of the object through the child bone.

6. The device for reconstructing moving objects in videos using a hierarchical neural deformation model of claim 5, wherein the hierarchical neural deformation model unit processes a coarse-level neural deformation of the object through the parent bone and processes a fine-level neural deformation of the object through the child bone, to learn an interaction between the parent-child bones through the neural network.

7. The device for reconstructing moving objects in videos using a hierarchical neural deformation model of claim 1, wherein the hierarchical neural deformation model unit determines the time-dependent bone deformation through a skinning weight.

8. The device for reconstructing moving objects in videos using a hierarchical neural deformation model of claim 7, wherein the hierarchical neural deformation model unit computes a skinning weight for how much each part of the object is influenced by a specific bone using a linear blend skinning (LBS) technique.

9. The device for reconstructing moving objects in videos using a hierarchical neural deformation model of claim 1, wherein the temporally deformed object representation unit reconstructs the hierarchical neural deformation model the object into the next time-independent bone structure through the canonical space.

10. The device for reconstructing moving objects in videos using a hierarchical neural deformation model of claim 1, further comprising:

a bone mask generation unit configured to generate a bone mask for detecting which region of the object a specific bone influences for the time-dependent bone deformation through a bone occupancy function (BOF).

11. The device for reconstructing moving objects in videos using a hierarchical neural deformation model of claim 1, further comprising:

a volume rendering unit configured to perform visualization through dimensional transformation of the temporally deformed object.

12. A method for reconstructing moving objects in videos using a hierarchical neural deformation model performed in a device for reconstructing moving objects in videos using a hierarchical neural deformation model, the method for reconstructing moving objects in videos using a hierarchical neural deformation model comprising:

a video input step of receiving a video;

an embedding generation step of generating a canonical embedding and a time embedding for an object in the video;

a hierarchical neural deformation model step of receiving the canonical embedding and the time embedding and capturing coarse-to-fine hierarchical neural deformations of the object, and outputting a time-independent bone structure and a time-dependent bone deformation of the object through a neural network; and a temporally deformed object representation step of representing the temporal deformation of the object as a temporally deformed object in a canonical space based on the time-independent bone structure and the time-dependent bone deformation of the object.

* * * * *